United States Patent
Bourdkane et al.

(10) Patent No.: US 6,712,427 B1
(45) Date of Patent: Mar. 30, 2004

(54) LUMBAR SUPPORT MEMBER

(75) Inventors: Elias Bourdkane, Windsor (CA); Alan Prettyman, Amherstburg (CA); Chris Hui, Windsor (CA); Phil Trudelle, Belle River (CA); Gordon Jiang, Tecumseh (CA); Knud Klingler, Nürnberg (DE)

(73) Assignee: Schukra-Geratebau GesmbH, Linz Leonding (AT)

( * ) Notice: Subject to any disclaimer, the term of this patent is extended or adjusted under 35 U.S.C. 154(b) by 0 days.

(21) Appl. No.: 09/718,263

(22) Filed: Nov. 22, 2000

(Under 37 CFR 1.47)

Related U.S. Application Data

(60) Provisional application No. 60/167,298, filed on Nov. 24, 1999.

(51) Int. Cl.[7] ............................... A47C 3/025
(52) U.S. Cl. .................................... 297/284.4
(58) Field of Search ......................... 297/284.4, 284.1

(56) References Cited

U.S. PATENT DOCUMENTS

| | | | | |
|---|---|---|---|---|
| 5,518,294 A | * | 5/1996 | Ligon, Sr. et al. | |
| 5,769,491 A | * | 6/1998 | Schwarzbich | |
| 6,296,308 B1 | * | 10/2001 | Cosentino et al. | |
| 6,430,801 B1 | * | 8/2002 | Cosentino | |
| 6,471,294 B1 | * | 10/2002 | Dammermann et al. | |
| 6,520,580 B1 | * | 2/2003 | Hong | |
| 6,523,898 B1 | * | 2/2003 | Ball et al. | |

* cited by examiner

Primary Examiner—Milton Nelson, Jr.
(74) Attorney, Agent, or Firm—Robert C. Haldiman, Esq.; Grant D. Kang, Esq.; Husch & Eppenberger, LLC

(57) ABSTRACT

An adjustable lumbar support assembly for a seat has a curved lumbar support member that is made from a plastic material and an adjustment mechanism operatively connected to the curved lumbar support member for adjusting between various degrees of curvature. The curved lumbar support member may include a plurality of reinforcing ribs that allow a greater degree of curvature adjacent one end of the element than the degree of curvature adjacent the other end of the element. The reinforcing ribs allow for varying degrees of curvature because the cross section of the ribs varies. Further, the reinforcing ribs are integral with the curved lumbar support member. The adjustable lumbar assembly could also include at least one resilient metal strap connected to the curved lumbar support member that allows a greater degree of curvature adjacent one end of the curved lumbar support member than the degree of curvature adjacent the other end of the element.

31 Claims, 6 Drawing Sheets

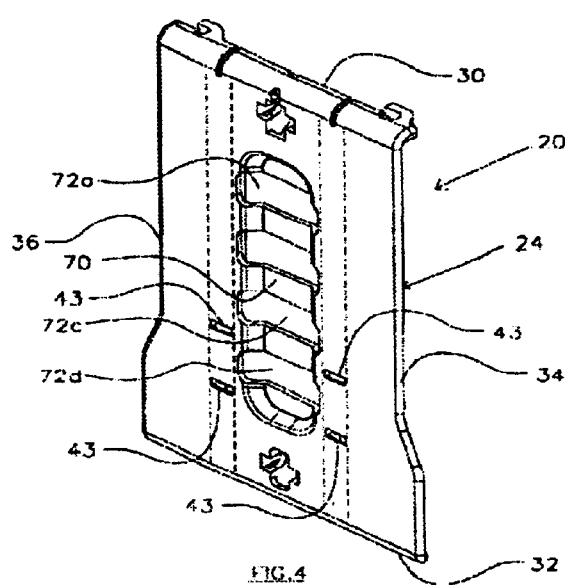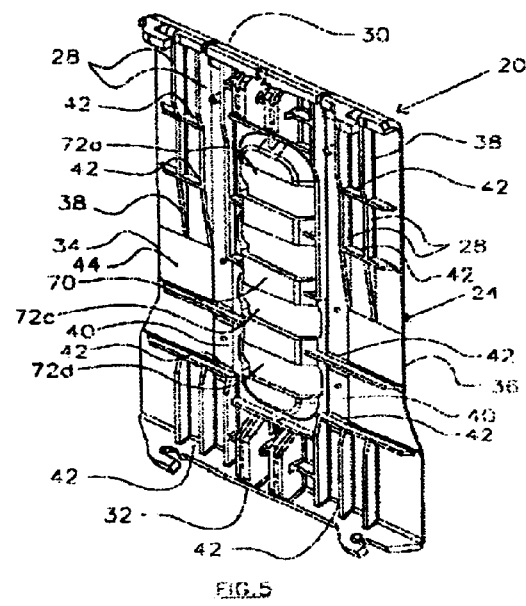

LUMBAR SUPPORT MEMBER

This application claims the benefit of Provisional application Ser. No. 60/167,298, filed Nov. 24, 1999.

BACKGROUND OF THE INVENTION

1. Field of the Invention

The subject invention relates generally to mechanisms for adjusting the shape of a backrest for seats, and more particularly mechanisms with adjustable lumbar assemblies in seats that conform more closely to the curvature of the human spine to support the back while a person is seated in the seat.

2. Description of the Prior Art

Mechanisms insertable into a backrest of a seat to adjust shape and provide better lumbar support are known in the art. Examples are found in U.S. Pat. Nos. 5,050,930 and 5,397,164 to Schuster et al.

Prior art mechanisms comprise a lumbar support member, commonly referred to as a "lumbar basket" or "basket", which is mounted for displacement along a guide track. The lumbar basket may have various configurations. A basic construction involves a pair of brackets displaceable along an axis of the guide track, resilient axial ribs joining the brackets, and resilient transverse ribs fixed centrally to the axial ribs with free ends extending laterally to either side of the axial ribs to provide a cushioning effect. Various mechanisms can be used to draw the brackets together in order to flex the lumbar basket from a relative flat rest state to various bowed states. Various mechanisms can also be used to displace the lumbar basket axially along the track. Thus, the curvature of the lumbar basket and its position within a backrest can be adjusted to provide greater comfort.

The basic lumbar basket described above has a flexed profile which is essentially a segment of a circle, and consequently does not conform adequately to the curvature of a user's spine. A prior art approach to altering the flexed profile involves fixing a partial central rib to an upper bracket and an upper set of the transverse ribs, making the upper end of the basket more rigid. This induces greater flexing of the basket proximate to the lower bracket, providing greater comfort for many users. There are, however, shortcomings to such an approach. Making the partial rib and then fastening it to multiple components of the basic lumbar basket contributes to cost. There is also little freedom to specify the profile ultimately presented by the basket. Various alternatives can be envisaged to produce baskets that flex to various profiles; however, the basic prior art lumbar basket is simple, and it would be desirable to avoid introducing components and manufacturing steps.

SUMMARY OF THE INVENTION AND ADVANTAGES

An adjustable lumbar assembly for a seat is disclosed comprising a support, a curved lumbar support member that is movably supported by the support for movement between various degrees of curvature, and an adjustment mechanism operatively connected to the curved lumbar support member for adjusting between various degrees of curvature. The curved lumbar support member consists of a plastic material and includes a plurality of reinforcing ribs that are integral with the curved lumbar support member to allow a greater degree of curvature adjacent one end of the support member than the degree of curvature adjacent the other end of the support member.

Therefore, this invention overcomes many of the disadvantages of the prior art designs since no additional components are needed to alter the shape of the curved lumbar support member. The design of this invention is less expensive to manufacture since no additional components need to be manufactured. Fewer people are needed to assemble the assembly since no additional components need to be added. Further, the weight of the seat is reduced since the curved lumbar support member is made from plastic.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a perspective view of the front of the curved lumbar support member including the metal straps;

FIG. 5 is a perspective view of the back of the curved lumbar support member including the metal straps;

DETAILED DESCRIPTION OF THE PREFERRED EMBODIMENT

Figure 1:
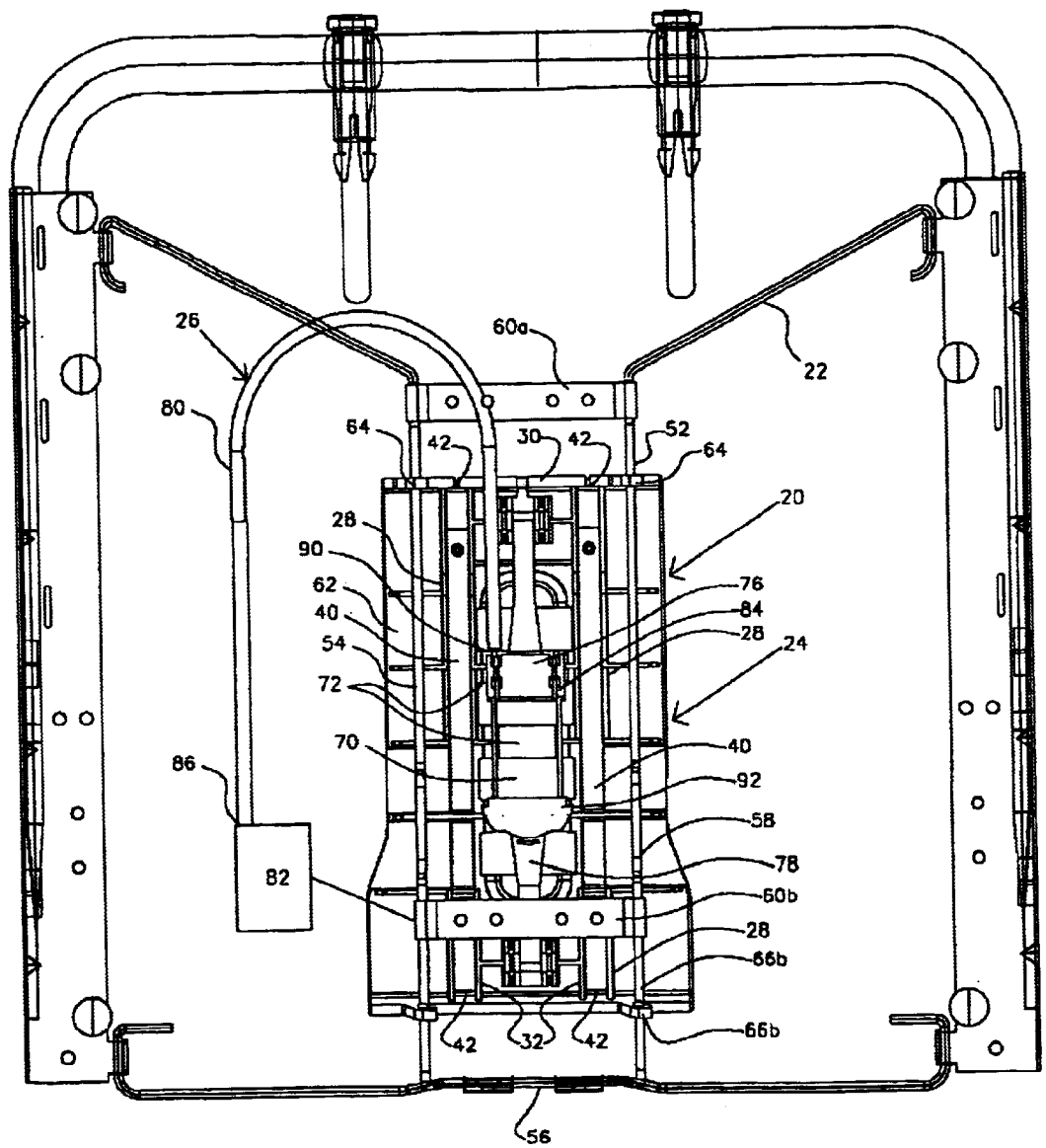
FIG. 1 is a rear view of the present invention attached to a seat frame.

Referring to the Figures, wherein like numerals indicate like or corresponding parts throughout the several views, an adjustable lumbar assembly for a seat is generally shown at 20. As shown in FIG. 1, the assembly 20 comprises a support 22, a curved lumbar support member 24, and an adjustment mechanism 26. The curved lumbar support member 24 is movably supported by said support 22 for movement between various degrees of curvature. The adjustment mechanism 26 is operatively connected to the curved lumbar support member 24 for adjusting it between various degrees of curvature. The assembly 20 includes a plurality of reinforcing ribs 28 that are integral with the curved lumbar support member 24 to allow a greater degree of curvature adjacent one end than the degree of curvature adjacent the other end.

Figure 2:
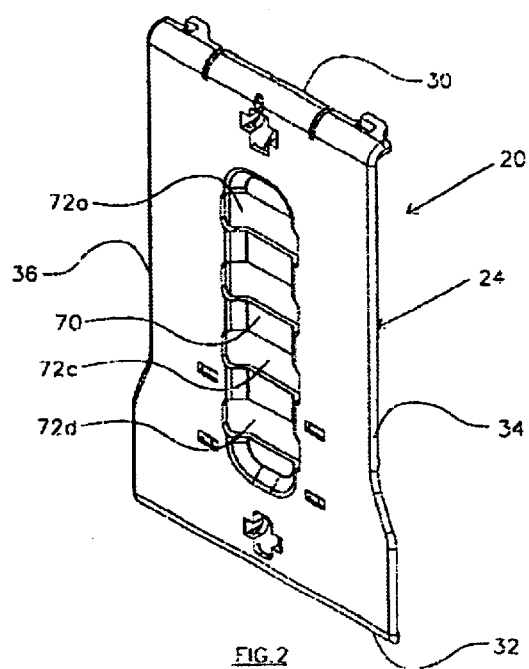
FIG. 2 is a perspective view of the front of the curved lumbar support member.

As shown in FIG. 2, the curved lumbar support member 24 consists of a plastic material and has a first end 30 and a second end 32. Preferably, the first end 30 of the curved lumbar support member 24 is parallel to the second end 32 of the curved lumbar support member 24. Further, the curved lumbar support member 24 further consists of a third end 34 and a fourth end 36. The third and fourth ends 34, 36 each extend between the first and second ends 30, 32 and are parallel to each other.

Figure 3:
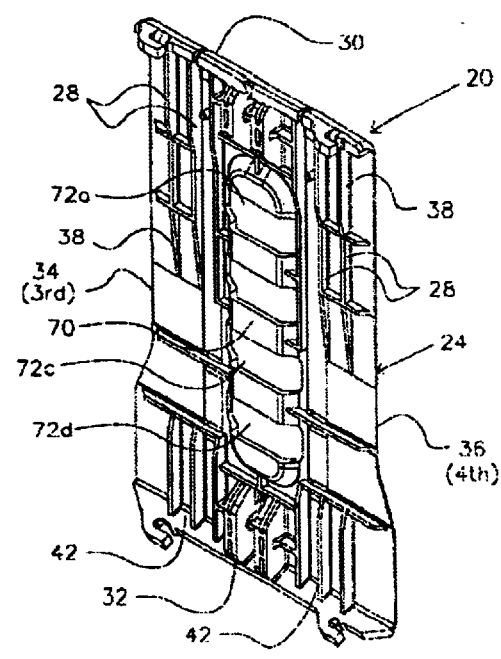
FIG. 3 is a perspective view of the back of the curved lumbar support member.

As shown in FIG. 3, the reinforcing ribs 28 extend between the first end 30 and second end 32 of the curved lumbar support member 24. Each reinforcing rib 28 has a cross section 38 that varies therealong. Preferably, the cross section 38 has a greater cross sectional area adjacent the first end 30 than the cross sectional area adjacent the second end 32.

In an alternative embodiment, shown in FIGS. 4 and 5, the curved lumbar support member 24 further comprises at least one resilient metal strap 40 extending within the curved lumbar support member 24. The curved lumbar support member 24 contains a plurality of slots 42 for each metal strap 40 for receiving each metal strap 40. The slots 42, as shown, are spaced at intervals along the strap 40 and along the length of the curved lumbar support member 24. The opposite side of the member 24, as shown in FIG. 4, may include apertures 43 at one or more of the locations of the slots 42 to aid in positioning and locating the straps 40. The slots 42 appear to produce the best results, however, when they act to hold the straps 40 against the face surface 45 of the member 24 as shown in FIG. 5. The metal straps 40 are shown in phantom in FIG. 4.

Figure 7:
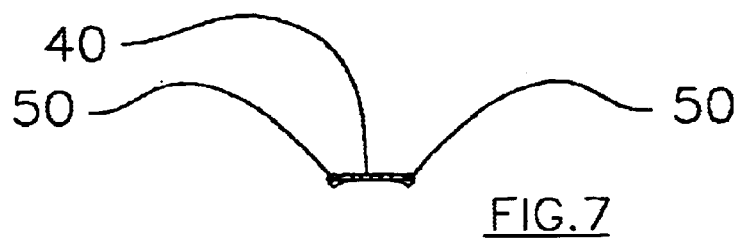
FIG. 7 is a cross sectional view of the first section of the metal strap.
Figure 6:
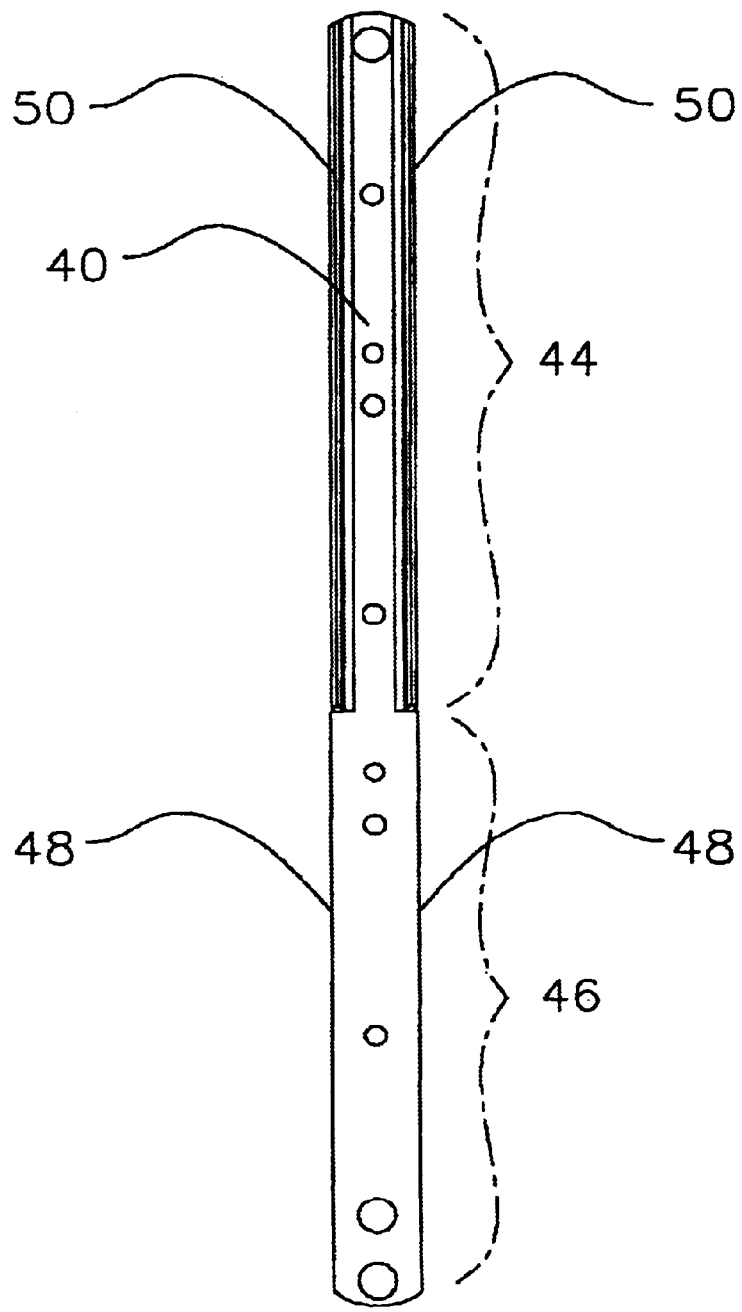
FIG. 6 is an elevational view of the metal strap with flanges.

As shown in FIGS. 6 and 7, each metal strap 40 comprises a first section 44 and a second section 46. The first section 44 has a high bending resistance and the second section 46 has a lower bending resistance than the first section 44. Further, the metal strap 40 has oppositely facing lateral sides 48. The first section 44 of the metal strap 40 includes a pair of reinforcing flanges 50 extending along the lateral sides 48 of the strap 40.

Figures 8, 9:
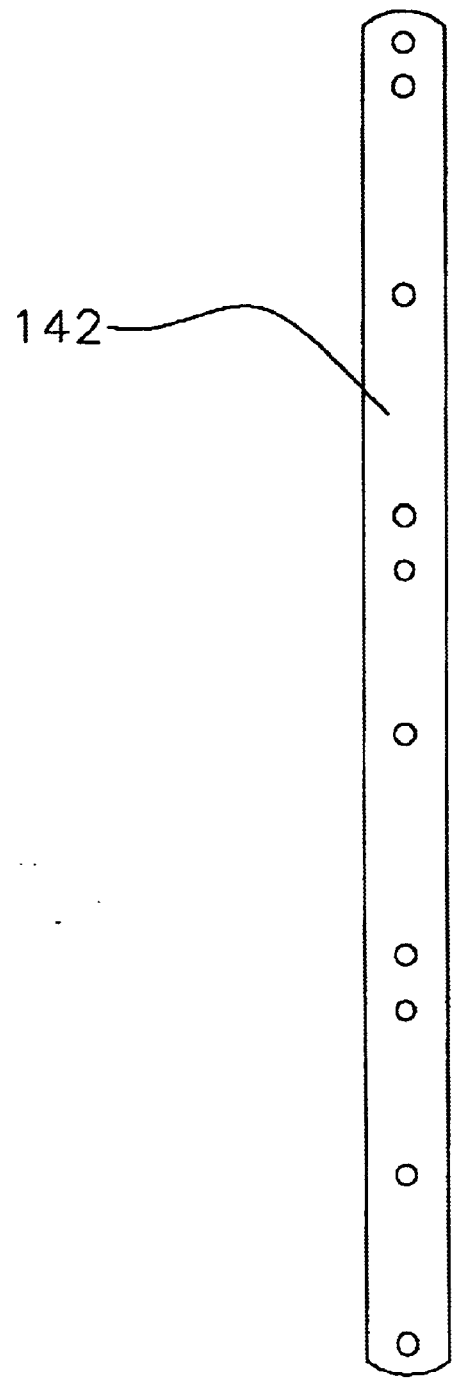
FIG. 8 is an elevational view of the metal strap without flanges.
FIG. 9 is a cross sectional view of the metal strap of FIG. 8.

An alternative embodiment of the metal strap 142 is shown in FIGS. 8 and 9. In this embodiment, the metal strap 142 does not include reinforcing flanges along the lateral sides of the strap. Rather, the metal strap 142 has a uniform cross section. The metal strap 142 extends from the first end 30 to the second end 32 of the curved lumbar support member 24.

Referring to FIG. 1, the support 22 consists of a guide track assembly. Preferably, the guide track assembly 22 consists of a pair of metal rods 52 positioned generally perpendicular to the first and seconds ends 30, 32 of the curved lumbar support member 24. More specifically, the guide track assembly 22 includes a single metal rod 52 in a generally U-shaped configuration comprising a first section 54, a second section 56 and a third section 58. The first and third sections 54, 58 are generally parallel and the second section 56 connects the first and third sections 54, 58 and is generally perpendicular to both the first and third sections 54, 58.

The guide track assembly 22 further comprises a pair of metal brackets 60a, 60b. Each bracket 60a, 60b is connected to the first and third sections 54, 58 of the metal rod 52 and is positioned generally perpendicular to the first and third sections 54, 58 of the metal rod 52. The first metal bracket 60a is attached to the first and third sections 54, 58 of the metal rod 52 adjacent the first end 30 of the curved lumbar support member 24. The second metal bracket 60b is attached to the first and third sections 54, 58 of the metal rod 52 adjacent the second end 32 of the curved lumbar support member 24.

The curved lumbar support member 24 has a first side 62 that is positioned adjacent the guide track 22. Further, the curved lumbar support member 24 comprises integral molded sleeves 64 positioned on its first side 62 for receiving the first and third sections 54, 58 of the metal rod 52. The sleeves 64 are moveable for displacement along the metal rods 52.

The first metal bracket 60a is attached to the first and third sections 54, 58 of the metal rod 52 outside of the first end 30 of the curved lumbar support member 24. The second metal bracket 60b is attached to the first and third sections 54, 58 of the metal rod 52 between the first and second ends 30, 32 of the curved lumbar support member 24.

The lumbar assembly 20 further comprises at least one fixing clip 66 attached to either the first or third section 54, 58 of the metal rod 52 between the second end 32 of the curved lumbar support member 24 and the second metal bracket 60b. Preferably, the lumbar assembly 20 includes two fixing clips 66a, 66b. The first fixing clip 66a is attached to the first section 54 of the metal rod 52 and the second fixing clip 66b is attached to the third section 58 of the metal rod 52.

Preferably, the curved lumbar support member 24 is generally rectangular shaped and the first and second ends 30, 32 of the curved lumbar support member 24 are shorter than the distance 68 between the first and second ends 30, 32. The curved lumbar support member 24 also preferably includes a central aperture 70.

The curved lumbar support member 24 further comprises at least one support rib 72 extending transversely across the aperture 70 and parallel to the first and second ends 30, 32. Preferably, there are four support ribs 72a, 72b, 72c, 72d extending across the aperture 70.

The adjustment mechanism 26 includes a first cable support component 76, a second cable support component 78, a cable 80, and a cable activation mechanism 82. The first cable support component 76 is connected to the curved lumbar support member 24 adjacent the first end 30 of the curved lumbar support member 24. The second cable support component 78 is connected to the curved lumbar support member 24 adjacent the second end 32 of the curved lumbar support member 24. The cable 80, having a first end 84 and a second end 86, interacts with the first and second cable support components 76, 78 and the cable activation mechanism 82 is connected to the cable 80 and causes movement of the cable 80.

The first cable support component 76 includes a connection mechanism 88 for receiving the first end 84 of the cable 80 and a channel 90 for guiding the cable 80. The second cable support component 78 includes a yolk 92 that provides a guide for the cable 80. Preferably, the first end 84 of the cable 80 is connected to the connection mechanism 88 in the first cable support component 78, the cable 80 wraps around the second cable support component yolk 92, the cable 80 is guided through the channel 90 in the first cable support component 76 and the second end 86 of the cable 80 is connected to the cable activation mechanism 82.

The cable activation mechanism 82 preferably includes a motor. Alternatively, the cable activation mechanism 82 is manually activated.

Preferably, the first end 30 of the curved lumbar support member 24 is displaced along the pair of metal rods 52 and the second end 32 of said curved lumbar support member 24 is stationary.

Figure 10:
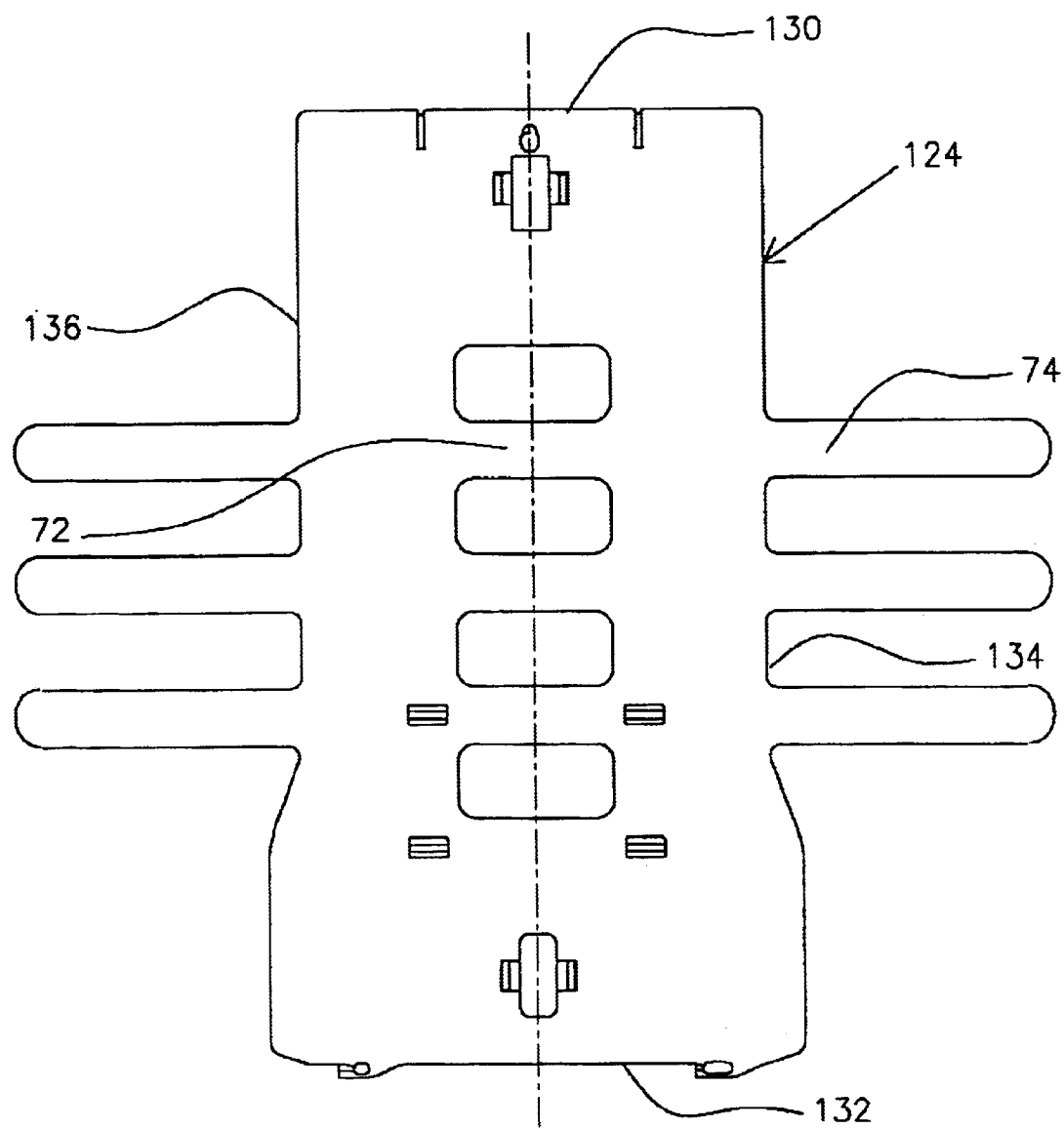
FIG. 10 is a front view of an alternative embodiment of the curved lumbar support member.

Alternatively, as shown in FIG. 10, the curved lumbar support member 124 has a first end 130, a second end 132, and sides 134 and 136. The curved lumbar support member 124 includes a plurality of extension ribs 74 that extend from the sides 134, 136. Extension ribs 74 are integral with the curved lumbar support member 124 and are aligned with the support ribs 72.

Obviously, many modifications and variations of the present invention are possible in light of the above teachings. The invention may be practiced otherwise than as specifically described within the scope of the appended claims.

What is claimed is:

1. An adjustable lumbar assembly for a seat, said assembly comprising:

a support, a curved lumbar support member movably supported by said support for movement between various degrees of curvature, said curved lumbar support member consisting of a plastic material and having a first end and a second end, an adjustment mechanism operatively connected to said curved lumbar support member for adjusting between various degrees of curvature, said assembly includes a plurality of reinforcing ribs integral with said curved lumbar support member to allow a greater degree of curvature adjacent one of said first end or said second end than the degree of curvature adjacent the other of said first end or said second end.

2. The lumbar assembly of claim 1 wherein said reinforcing ribs extend between said first end and said second end, each of said reinforcing ribs has a cross section which varies therealong.

3. The lumbar assembly of claim 2 wherein a cross section of one of said reinforcing ribs adjacent said first end has a greater cross sectional area than a cross sectional area of one of said reinforcing ribs adjacent said second end.

4. The lumbar assembly of claim 3 further comprising at least one resilient metal strap extending from said first end to said second end and said first end and said second end each defining a slot therein for receiving said metal strap.

5. The lumbar assembly of claim 4 wherein said metal strap comprises a first section and a second section, said first section having a high bending resistance and said second section having a lower bending resistance than said first section.

6. The lumbar assembly of claim 5 wherein said metal strap has oppositely facing lateral sides and said first section of said metal strap includes a pair of reinforcing flanges extending along said lateral sides of said strap.

7. The lumbar assembly of claim 6 wherein said support consists of a guide track assembly.

8. The lumbar assembly of claim 7 wherein said first end of said curved lumbar support member is parallel to said second end of said curved lumbar support member and said guide track assembly consists of a pair of metal rods positioned generally perpendicular to said first and seconds ends of said curved lumbar support member.

9. The lumbar assembly of claim 8 wherein said guide track assembly includes a single metal rod in a generally U-shaped configuration comprising a first section, a second section and a third section, wherein said first and third sections are generally parallel and said second section connects said first and third sections and is generally perpendicular to said first and third sections.

10. The lumbar assembly of claim 9 wherein said guide track assembly further comprises a pair of metal brackets each connected to said first and third sections of said metal rod and positioned generally perpendicular to said first and third sections of said metal rod.

11. The lumbar assembly of claim 10 wherein one of said pair of metal brackets is attached to said first and third sections of said metal rod adjacent said first end of said curved lumbar support member and said other of said pair of metal brackets is attached to said first and third sections of said metal rod adjacent said second end of said curved lumbar support member.

12. The lumbar assembly of claim 11 wherein said curved lumbar support member has a first side positioned adjacent said guide track assembly and further comprising integral molded sleeves positioned on said first side for receiving said first and third sections of said metal rod.

13. The lumbar assembly of claim 12 wherein said sleeves are moveable for displacement along said metal rods.

14. The lumbar assembly of claim 13 wherein one of said pair of metal brackets is attached to said first and third sections of said metal rod outside of said first end of said curved lumbar support member and said other of said pair of metal brackets is attached to said first and third sections of said metal rod between said first and second ends of said curved lumbar support member.

15. The lumbar assembly of claim 14 further comprising at least one fixing clip attached to at least one of said first and third sections of said metal rod between said second end of said curved lumbar support member and said other of said pair of metal brackets.

16. The lumbar assembly of claim 15 including two of said fixing clips, a first of said fixing clips is attached to said first section of said metal rod and a second of said fixing clips is attached to said third section of said metal rod.

17. The lumbar assembly of claim 16 wherein said curved lumbar support member is generally rectangular shaped and wherein said first and second ends of said curved lumbar support member are shorter than the distance between said ends.

18. The lumbar assembly of claim 17 wherein said curved lumbar support member defines a central aperture.

19. The lumbar assembly of claim 18 wherein said curved lumbar support member further comprises at least one support rib extending transversely across said aperture and parallel to said first and second ends.

20. The lumbar assembly of claim 19 including four of said support ribs.

21. The lumbar assembly of claim 20 wherein said curved lumbar support member further comprises a third end, a fourth end, and a plurality of extension ribs, said third and fourth ends each extending between said first and second ends parallel to each other and said plurality of extension ribs extending from said third and fourth ends perpendicular to said third and fourth ends.

22. The lumbar assembly of claim 21 wherein said extension ribs are integral with said curved lumbar support member.

23. The lumbar assembly of claim 22 wherein said extension ribs are aligned with said support ribs.

24. The lumbar assembly of claim 23 wherein said adjustment mechanism comprises a first cable support component connected to said curved lumbar support member adjacent said first end, a second cable support component connected to said curved lumbar support member adjacent said second end, a cable interacting with said first and second support components, and a cable activation mechanism connected to said cable for causing movement of said cable.

25. The lumbar assembly of claim 24 wherein said cable has a first end and a second end.

26. The lumbar assembly of claim 25 wherein said first cable support component includes a connection mechanism for receiving said first end of said cable and a channel for guiding said cable.

27. The lumbar assembly of claim 26 wherein said second cable support component includes a yolk providing a guide for said cable.

28. The lumbar assembly of claim 27 wherein said first end of said cable is connected to said connection mechanism in said first cable support component, said cable wraps around said second cable support component yolk, said cable is guided through said channel in said first cable support component and said second end of said cable is connected to said cable activation mechanism.

29. The lumbar assembly of claim 28 wherein said cable activation mechanism is manually activated.

30. The lumbar assembly of claim 28 wherein said cable activation mechanism includes a motor.

31. The lumbar assembly of claim 28 wherein said first end of said curved lumbar support member is displaced along said pair of metal rods and said second end of said curved lumbar support member is stationary.

* * * * *